(12) United States Patent
Kasper et al.

(10) Patent No.: US 7,212,695 B2
(45) Date of Patent: *May 1, 2007

(54) VARIABLE OPTICAL DELAY LINE WITH A LARGE CONTINUOUS TUNING RANGE

(75) Inventors: Albin Lloyd Kasper, Clifton, NJ (US); Jane D. LeGrange, Princeton, NJ (US); Christi Kay Madsen, South Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/634,403

(22) Filed: Aug. 5, 2003

(65) Prior Publication Data

US 2005/0031248 A1 Feb. 10, 2005

(51) Int. Cl.
*G02B 6/00* (2006.01)
*H04B 10/00* (2006.01)

(52) U.S. Cl. .................................. 385/13; 398/161
(58) Field of Classification Search ............ 385/31, 385/32, 24, 27, 37
See application file for complete search history.

(56) References Cited

U.S. PATENT DOCUMENTS

| | | | |
|---|---|---|---|
| 5,259,051 A | 11/1993 | Burack et al. | |
| 5,629,790 A | 5/1997 | Neukermans et al. | |
| 5,793,907 A * | 8/1998 | Jalali et al. | 385/24 |
| 5,943,636 A * | 8/1999 | Baldwin et al. | 702/85 |
| 6,201,631 B1 | 3/2001 | Greywall | |
| 6,275,629 B1 | 8/2001 | Eggleton et al. | |
| 6,289,151 B1 * | 9/2001 | Kazarinov et al. | 385/32 |
| 6,300,619 B1 | 10/2001 | Aksyuk et al. | |
| 6,385,353 B1 * | 5/2002 | Boyne et al. | 385/2 |
| 6,393,177 B2 * | 5/2002 | Paek | 385/24 |
| 6,590,684 B1 * | 7/2003 | Goodfellow | 385/123 |
| 6,748,142 B2 * | 6/2004 | Madsen | 385/49 |
| 6,784,416 B2 * | 8/2004 | Biyikli | 250/225 |
| 6,934,431 B2 * | 8/2005 | Braun et al. | 385/15 |
| 6,956,991 B2 * | 10/2005 | Madsen | 385/27 |
| 2004/0080705 A1 * | 4/2004 | Koh et al. | 349/196 |

* cited by examiner

*Primary Examiner*—Sung Pak

(57) ABSTRACT

In accordance with the invention, a variable optical delay line with a large continuous tuning range comprises an incremental variable delay line to provide delay selected from a sequence of incrementally differing delays and a continuous variable delay line to provide a continuously variable delay over a range encompassing a delay increment in the first variable delay line. In a preferred embodiment, the first variable delay line comprises an array of delay paths where each path is curved differently from the others to provide an incrementally different delay. The second variable delay line is a tunable delay path continuously tunable over the delay increment of the first.

10 Claims, 2 Drawing Sheets

VARIABLE OPTICAL DELAY LINE WITH A LARGE CONTINUOUS TUNING RANGE

CROSS REFERENCE TO RELATED APPLICATION

This invention is related to U.S. application Ser. No. 10/643,481 filed by C. Madsen et al. concurrently herewith and entitled "Compact Solid-State Variable Optical Delay Line With A Large Continuous Tuning Range."

FIELD OF THE INVENTION

This invention relates to variable optical delay lines and, in particular, to a variable optical delay line with a large continuous tuning range.

BACKGROUND OF THE INVENTION

One of the major advances in communications in recent years has been the increased use of optical fiber systems for carrying large quantities of information with low distortion and low cost over great distances.

Optical delay lines are important components in such optical fiber communication systems. They are critical components in switching streams of optical signals from one path to another. They are used in packet switching for Internet applications, and they are building blocks in the correlation filters used to recognize packet addresses for the Internet. Delay lines are also used in the buffers that control the timing of signal routing. And they are used for synchronizing data bits, for compensating dispersion between different optical paths, and for compensating differential delay between paths.

Variable delay lines are needed because different delays may be required at different times. In addition to variation required by the dynamics of optical network components, variation of delays in the optical network may be required to compensate differences in RF transmission paths due, for example, to changes in a satellite orbit, to spaced apart multiple ground antennas, or to atmospheric scintillation.

Conventional variable optical delay lines are incremental rather than continuously variable. A typical conventional variable delay line comprises a plurality of optical fibers, each cut to a slightly different length, and an optical switch to select the fiber path, thereby selecting the delay time. Since the differences in length are incremental, the delay line is incremental rather than continuous. Thus the variable delay line can only approximate the precise delay being sought.

Accordingly it would be advantageous to provide an improved variable optical delay line that provides continuous resolution over a large dynamic range.

SUMMARY OF THE INVENTION

In accordance with the invention, a variable optical delay line with a large continuous tuning range comprises an incremental variable delay line to provide delay selected from a sequence of incrementally differing delays and a continuous variable delay line to provide a continuously variable delay over a range encompassing a delay increment in the first variable delay line. In a preferred embodiment, the first variable delay line comprises an array of delay paths where each path is curved differently from the others to provide an incrementally different delay. The second variable delay line is a tunable delay path continuously tunable over the delay increment of the first.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that the drawings are for purposes of illustrating the concepts of the invention and are not to scale.

DETAILED DESCRIPTION

Figure 1:
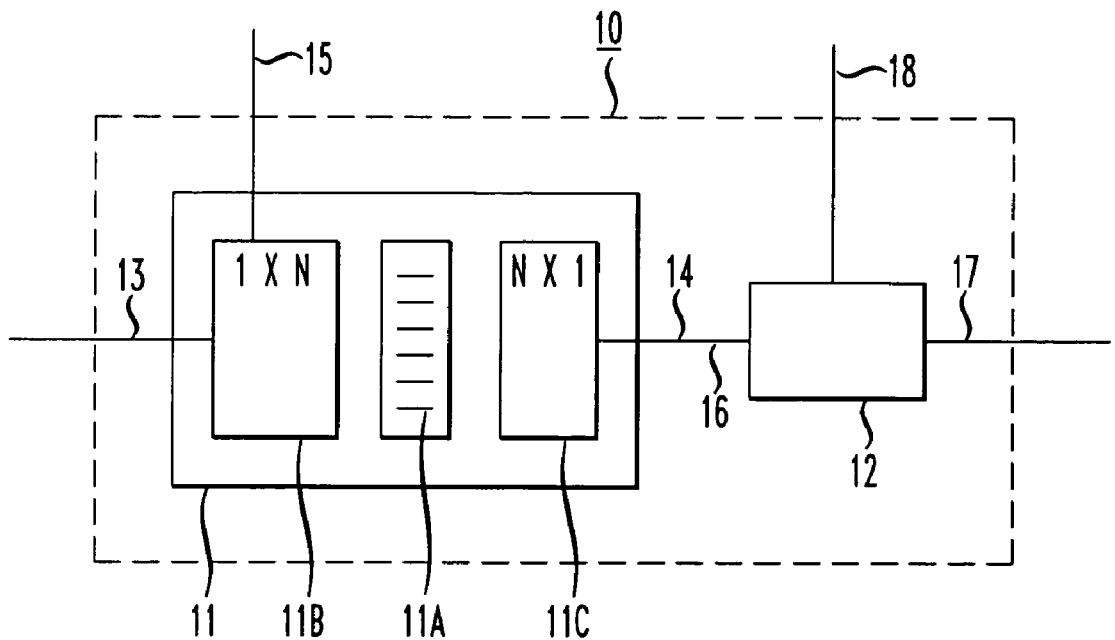
FIG. 1 is a schematic diagram of a variable optical delay line in accordance with the invention.

Referring to the drawings, FIG. 1 schematically illustrates a variable optical delay line 10 with a large continuous tuning range comprising an incremental variable delay line 11 in series with a continuously variable delay line 12. The incremental delay line 11 has an optical input 13 and an optical output 14. An incremental control signal applied via signal path 15 selects the delay path between the optical input and the optical output.

Incremental delay line 11 typically comprises a plurality of optical waveguide paths 11A of incrementally different path length and one or more optical switches 11B, 11C to determine which optical path connects the input to the output. The control signal selects the particular path and thus the incremental delay. Preferably the incremental differences between successive paths form a monotonic sequence of delays increasing or decreasing by substantially equal increments, e.g. T, 2T, 3T, . . . , nT.

Incrementally delayed light from delay line 11 also passes through continuously variable delay line 12. The line 12 includes input 16, an output 17 and a signal path 18 for a continuous control signal. While delay line 12 can tune light over only a small fraction of the range of delay line 11, the continuous tuning range of delay line 11 can be chosen to encompass the separation in delay between successive incremental delays in line 11, e.g. the range (0, T). The result is that the serial combination of lines 11 and 12 can produce virtually all possible delays over a range exceeding that of delay line 11. Thus the device provides a large continuous tuning range much larger than can be produced by continuous delay line 12. It should be noted that either line 11 or line 12 can be first in the series forming device 10.

Figure 2:
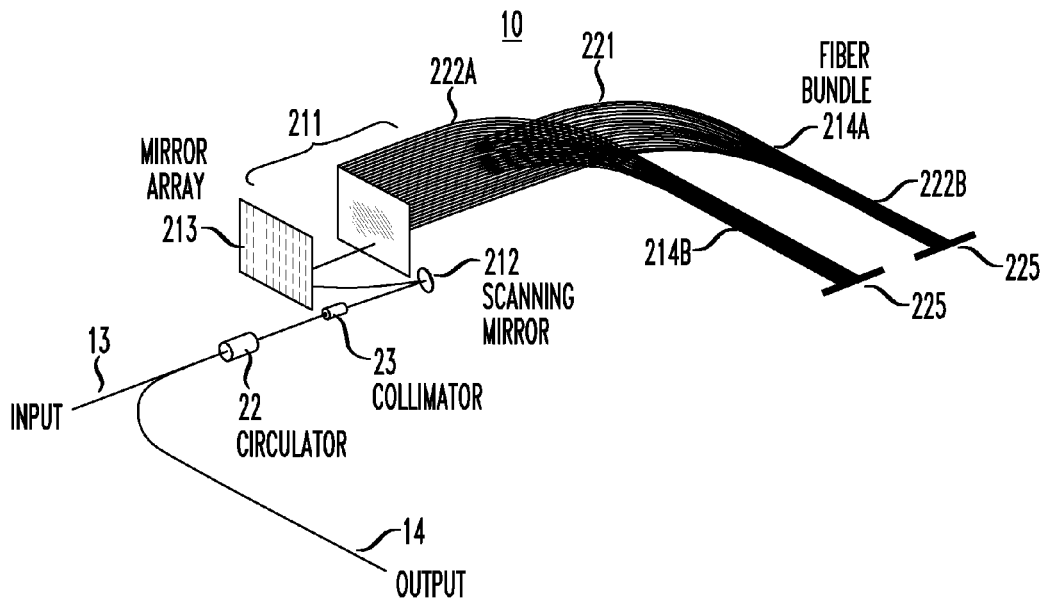
FIG. 2 illustrates an advantageous incremental delay line for use in the embodiment of FIG. 1.

FIG. 2 illustrates an advantageous incremental variable delay line 11 for use the embodiment of FIG. 1.

The delay line 11 comprises an optical switch 211 such as a micromechanical mirror switch (MEMs switch) composed of a controllable scanning mirror 212 and a mirror array 213. The delay line further includes one or more fiber arrays 214A and 214B of fiber delay paths. As will be shown below, each fiber array comprises a plurality of fiber paths. Each fiber path comprises a curved region 221 where the fiber is curved differently from the other fibers in the array, one or more second regions 222A, 222B where the fiber is parallel to other fibers in the array, and a reflector 225. The array is designed so that each fiber path will reflect an input signal with a different delay than the other paths in the array. An array of collimator lenses (not shown) couples light in and out of the fiber array.

Suitable MEMs mirror switches and their fabrication are described, for example, in U.S. Pat. No. 5,629,7990 issued to Nukermans et al. On May 13, 1997 which is incorporated herein by reference. Suitable switches are also described in U.S. application Ser. No. 09/415,178 filed by V. Aksyuk on Nov. 8, 1999 and Ser. No. 09/559,216 filed by Greywall on Apr. 26, 2000, both of which are incorporated herein by reference.

The fiber arrays 214A and 214B present important advantages in manufacture. Each array can be readily fabricated as a computer generated optical fiber circuit using techniques well known in the art. In essence, a computer guides the point-by-point placement of each fiber on an adhesive-coated substrate (not shown). This process is described in detail in U.S. Pat. No. 5,259,051 issued to J. Burack et al. On Nov. 2, 1993 and U.S. Pat. No. 5,421,970 issued to W. Holland on Jun. 6, 1995, which are incorporated herein by reference.

The reflectors 225 can be Bragg gratings conventionally formed in the fibers by conventional methods such as by sidewriting with ultraviolet light. An important advantage of the parallel orientation of the fibers in region 222B is that the gratings can be aligned along the same transverse section of a fiber ribbon. This has the important effect that all gratings across a ribbon, e.g. 214A, 214B can all be formed in a single UV exposure. Alternatively, the reflectors 225 can be mirrors or mirror coatings.

Referring to FIG. 2, the operation of the incremental variable delay line 11 may now be explained. An input optical signal can be applied via an input fiber 13. It passes through an optical circulator 22 and strikes scanning mirror 212. Mirror 212 is controlled to direct the signal to the mirror of array 213 which will reflect the input signal into the fiber path of a fiber array that provides the desired delay. The signal propagates into the fiber path and is reflected by the reflector 225. Upon reflection, the signal reemerges from the fiber path, reflects from the mirrors 213 and 212, passes through the collimator 23, and is redirected by circulator 22 to output fiber 14.

Figure 3:
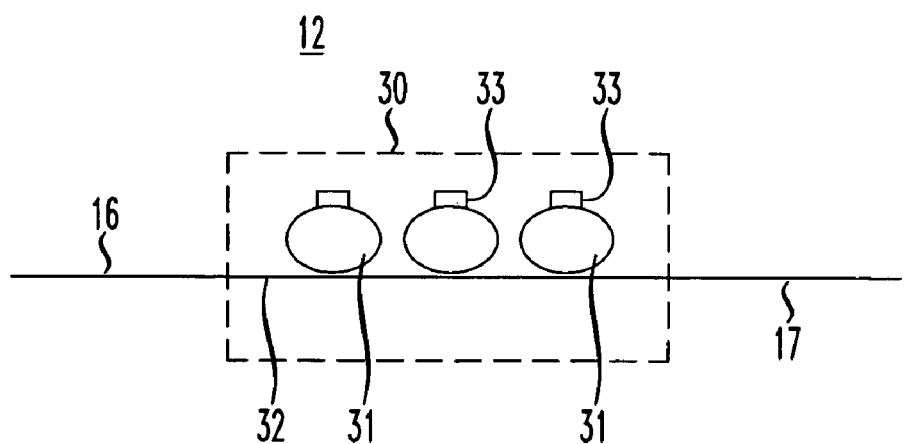
FIG. 3 shows an advantageous continuous delay line for use in the embodiment of FIG. 1.

The continuously tunable delay line can be any one of a variety of continuously tunable optical delay devices that provide a continuum of delay lengths, such as all pass filters and tunable chirped gratings. FIG. 3 illustrates an advantageous continuously tunable multi-stage all pass filter (APF) 30. The APF 30 is preferably a ring cascade structure wherein each ring resonator 31 is independently coupled to an optical waveguide path 32, and the optical path length of each resonator—and hence the delay—can be tuned by respective phase shifters 33. The phase shifting can be electro optic, thermo optic or by current injection. The structure and operation of such tunable APF delay devices is set forth in detail in U.S. Pat. No. 6,289,151 issued to Kazarinov et al. on Sep. 11, 2001 and entitled "All Pass Optical Filters". U.S. Pat. No. 6,289,151 is incorporated herein by reference.

Figure 4:
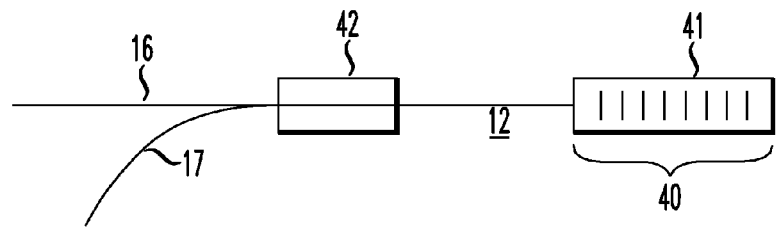
FIG. 4 illustrates an alternative continuous delay line.

Alternatively, the continuously tunable delay line 12 can comprise a tunable chirped Bragg grating as illustrated in FIG. 4. In essence, the line 12 comprises a tunable chirped Bragg grating 40. A control element such as a heater 41 is used to control the path length between successive perturbations along the grating which, in turn, controls the path length incurred by an input optical signal before it is reflected back through circulator 42 to the output. The control element 41 can be a heater thermally coupled to the grating. The structure and fabrication of such tunable delay devices is described in U.S. Pat. No. 6,275,629 to B. Eggleton et al. issued Aug. 14, 2001 and entitled, "Optical Grating Devices With Adjustable Chirp", which is incorporated herein by reference.

In an exemplary embodiment, fibers are routed on a substrate with a 180° bend. Each fiber has a Bragg grating written in it that reflects close to 100% of the optical signal. The gratings are written in the fibers after the curved region of the 180° bend, where the fibers are straight. The fiber gratings are placed so that the distance between the input ends of the fibers and the gratings is the same for all of the fibers. Adjacent fibers are touching such that the differential delay due to the changing bend radius is 8 ps for the round trip path due to the 0.25 mm pitch of the fiber array. A 1×n switch, for example a MEMS switch, is connected to the fiber array using a mass fusion splicer to splice the output fibers from the switch to the fibers of the array. The use of the mass fusion splicer results in equal path lengths from the switch to the inputs of the fiber array. The reflected signal is separated from the input signal by a circulator on the input. The delay increments from fiber to fiber consist of the 8 ps round trip delay increment and the channel-to-channel variable delay due to the switch. The reflected signal can be routed from the circulator to the all pass filter which can be adjusted for continuous delay increments. The all-pass filter can be used to fine tune the delay between the coarser increments obtained from the combination of the switch and fiber based delay, in addition to any other sources of path length differences. The fiber based delay can be fabricated from an initial incremental delay of 10–20 ps (including the switch) to 10 ns. For example, if 1000 fibers are routed with a 180° angle, the delay increment between the inner most and outer most fibers will be 8 ns.

There are many alternative variations on this embodiment. Multiple gratings that can be switched from a transmitting to a reflecting state (either through heater switches or by stretching the gratings) can be written in each fiber. This can be used to obtain delay steps on the order of tens to hundreds of ps (for example, gratings that are 10 cm apart will give delay steps of 0.5 ns). This permits a wide range of delay to be achieved with fewer fibers. The reflected output signal from the selected grating on the selected fiber in such an array can then be routed through an all-pass filter for fine tuning the delay increment.

The variable delay can also be made without gratings, for example, routing different lengths of fiber on a substrate, and splicing the output ends of the fibers to an n×1 switch. The output signal from that switch can then be transmitted through the all-pass filter device for fine tuning the delay.

It is understood that the above-described embodiments are illustrative of only a few of the many possible specific embodiments, which can represent applications of the invention. Numerous and varied other arrangements can be made by those skilled in the art without departing from the spirit and scope of the invention.

What is claimed is:

1. A variable optical delay line having an extended continuous tuning range, comprising:

an incrementally variable optical delay line configured to delay a received optical signal by an incremental delay length selected from a sequence of discrete delay lengths which differ in length by multiples of a delay increment; and a continuously variable optical delay line, coupled by an optical coupling to said incrementally variable optical delay line, configured to delay said received optical signal by a continuous delay length selected from a continuum of delay lengths having a range substantially encompassing said delay increment, wherein said optical coupling is a serial coupling such that said incremental delay length is added to said continuous delay length to provide a range of selectable delay lengths that is continuous over a range that substantially encompasses said sequence of discrete delay lengths.

2. The variable delay line of claim 1 wherein the incrementally variable optical delay line further comprises an optical switch for switching the optical signal to the incremental delay length.

3. The variable delay line of claim 1 wherein the sequence of discrete delay lengths comprise a set of paths having at least one region of parallel paths and a second region wherein each path differs in curvature to produce incrementally different path lengths.

4. The variable delay line of claim 1 wherein the continuously variable optical delay line comprises an all pass optical filter.

5. The variable delay line of claim 4 wherein the all pass filter comprises a multistage all pass filter comprising a plurality of ring resonators optically coupled to an optical waveguide.

6. The variable delay line of claim 1 wherein the continuously variable optical delay line comprises a chirped grating.

7. The variable delay line of claim 2 wherein the continuously variable optical delay line comprises an all pass optical filter.

8. The variable delay line of claim 3 wherein the continuously variable optical delay line comprises an all pass optical filter.

9. The variable delay line of claim 3 wherein the continuously variable optical delay line comprises a multistage all pass optical filter comprising a plurality of ring resonators optically coupled to an optical waveguide.

10. The variable delay line of claim 1 wherein the continuously variable optical delay line receives the optical signal before the incrementally variable optical delay line.

* * * * *